United States Patent [19]

Chen

[11] Patent Number: 5,213,351

[45] Date of Patent: May 25, 1993

[54] BUILT-UP TOOL CARRIAGE

[76] Inventor: Tony Chen, No. 6, Lane 609, Sec. 1, Chungchen Rd., Ta Chia Chen, Taichung Hsien, Taiwan

[21] Appl. No.: 904,566

[22] Filed: Jun. 26, 1992

[51] Int. Cl.$^5$ .............................................. B62B 1/26
[52] U.S. Cl. ............................... 280/47.19; 280/47.24; 280/47.26; 248/129; 312/209
[58] Field of Search ............... 280/639, 651, 652, 659, 280/47.131, 47.17, 47.18, 47.19, 47.24, 47.26, 47.28, 47.34, 47.35; 248/127, 128, 129; 312/206, 207, 209; 211/70.6, 195

[56] References Cited

U.S. PATENT DOCUMENTS

| | | | |
|---|---|---|---|
| 2,905,480 | 9/1959 | Giovannelli | 280/47.19 |
| 3,010,775 | 11/1961 | Giovannelli | 280/47.19 |
| 4,120,549 | 10/1978 | Bureau | 280/47.35 |
| 4,976,450 | 12/1990 | Ellefson | 280/47.35 |
| 4,989,291 | 2/1991 | Parent | 280/47.35 |
| 5,013,055 | 5/1991 | Labrum | 248/129 |
| 5,083,664 | 1/1992 | Feng | 211/70.6 |

*Primary Examiner*—Richard M. Camby
*Attorney, Agent, or Firm*—Bacon & Thomas

[57] ABSTRACT

A built-up tool carriage includes a base supported on wheels, which has a transverse handhold on the front edge thereof for moving the carriage with the hand, a back panel and two side panels attached to the base at right angles through tenon-and-groove joints, two front door panels respectively hinged to the side panels, which includes one having a plurality of holes on the inside for inserting hooks for hanging tools and the other having tool compartments of different sizes and shapes on the inside for keeping different tools and accessories, a plurality of sliding boxes moved to slide in and out between the side panels, and a top cover hinged to the back panel and covered over the side panels and the front door panels on the top. Connecting rods are inserted into aligned holes on the side panels, the base and the back panel and secured by hand screws. Bolts which have each a front split cone are inserted through holes on the front door panels and the top cover, and holes on the top cover and the back panel to connect them in place.

1 Claim, 3 Drawing Sheets

BUILT-UP TOOL CARRIAGE

BACKGROUND OF THE INVENTION

The present invention relates to tool carriages, and relates more particularly to a built-up tool carriage for carrying a variety of tools which can be conveniently set up or collapsed with the hands.

Various portable tool boxes and chests are known and widely in use for the advantage of mobility. However, a portable tool box or chest has a limited space for keeping a small quantity tools. Increasing the size of a portable tool box or chest makes it heavy and inconvenient to carry. If a tool cabinet is used for keeping a big quantity of tools, it can only be place at a fixed place. In order to eliminate this problem, there are disclosed various wheeled tool cabinets for carrying tools from place to place. These mobile tool cabinets may be made from metal or plastic materials. However, a mobile metal tool cabinet is heavy and inconvenient for delivery, and its manufacturing cost is also high. Although a mobile plastic tool cabinet is light weight it is still inexpensive to manufacture because an expensive, big scale molding tool is required for making the big housing of a tool cabinet. Furthermore, these conventional mobile tool cabinets are commonly factory-made and not collapsible, they do not meet the requirements of do-it-yourself.

SUMMARY OF THE INVENTION

The present invention has been accomplished under the aforesaid circumstances. It is therefore an object of the present invention to provide a built-up tool carriage which can be conveniently set up for carrying a big quantity of different tools from place to place. It is another object of the present invention to provide a built-up tool carriage which is inexpensive to manufacture. It is still another object of the present invention to provide a built-up tool carriage which can be conveniently disassembled for convenient transportation with less space occupation. It is still another object of the present invention to provide a built-up tool carriage which can be conveniently manually assembled or disassembled without the use of any tools. According to the present invention, there is provided a built-up tool carriage which is generally comprised of a base supported on wheels, a back panel, two side panels, two front door panels, and a top cover. The back panel and the side panels are respectively attached to the base at right angles through tenon-and-groove joints and secured into shape by tubular connecting rods and hand screws. The top cover and the front door panels are respectively hinged to the back panel and the side panels by bolts. Each bolt has a front end formed into a split cone, and therefore, it can be conveniently manually fastened into holes on the side panels and the front door panel or holes on the top cover and the back panel to connect the front door panels and the top cover to the side panels and the back panel respectively.

DETAILED DESCRIPTION OF THE PREFERRED EMBODIMENT

Figure 1:
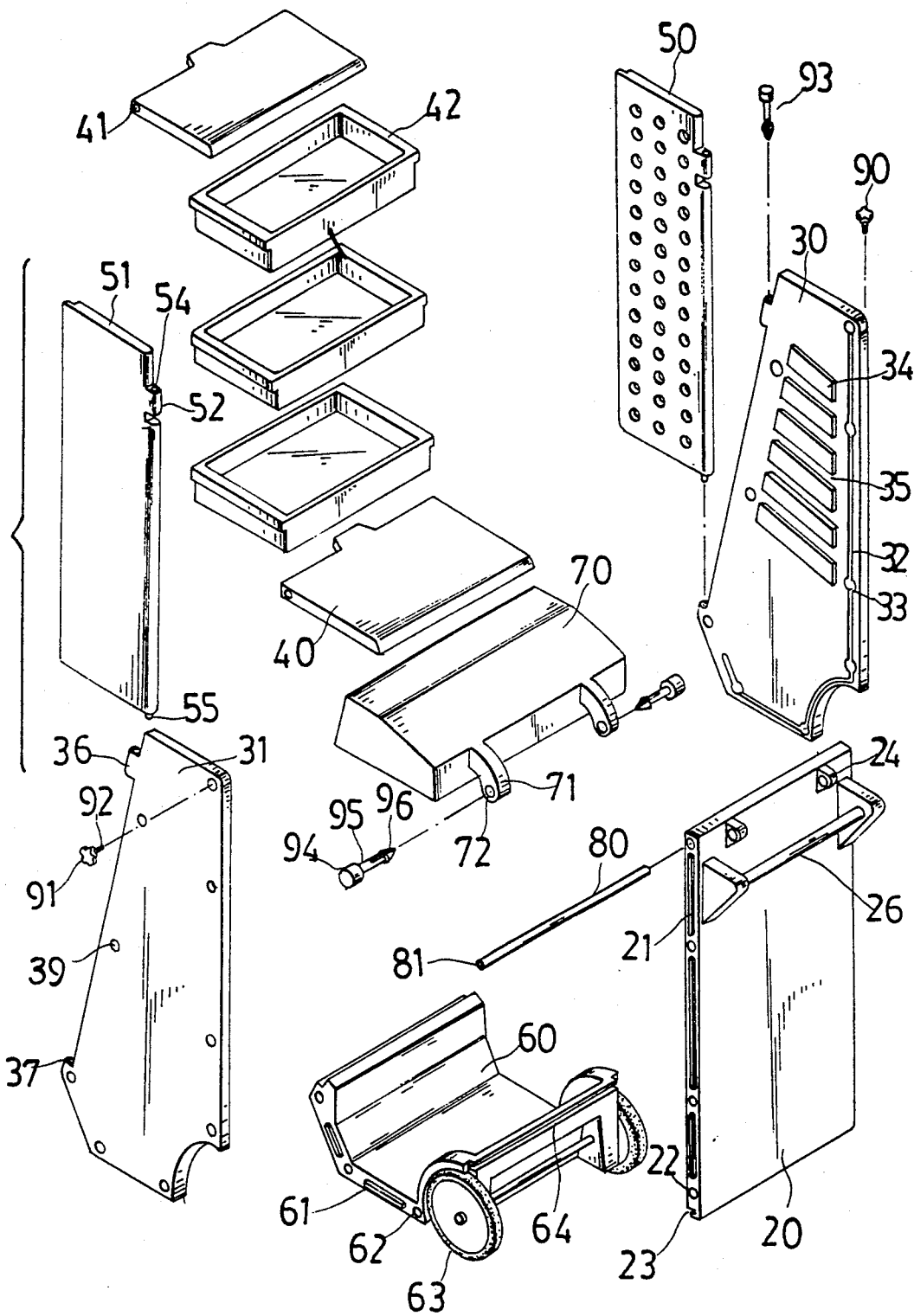
FIG. 1 is an exploded view of the preferred embodiment of the built-up tool carriage of the present invention.
Figure 2:
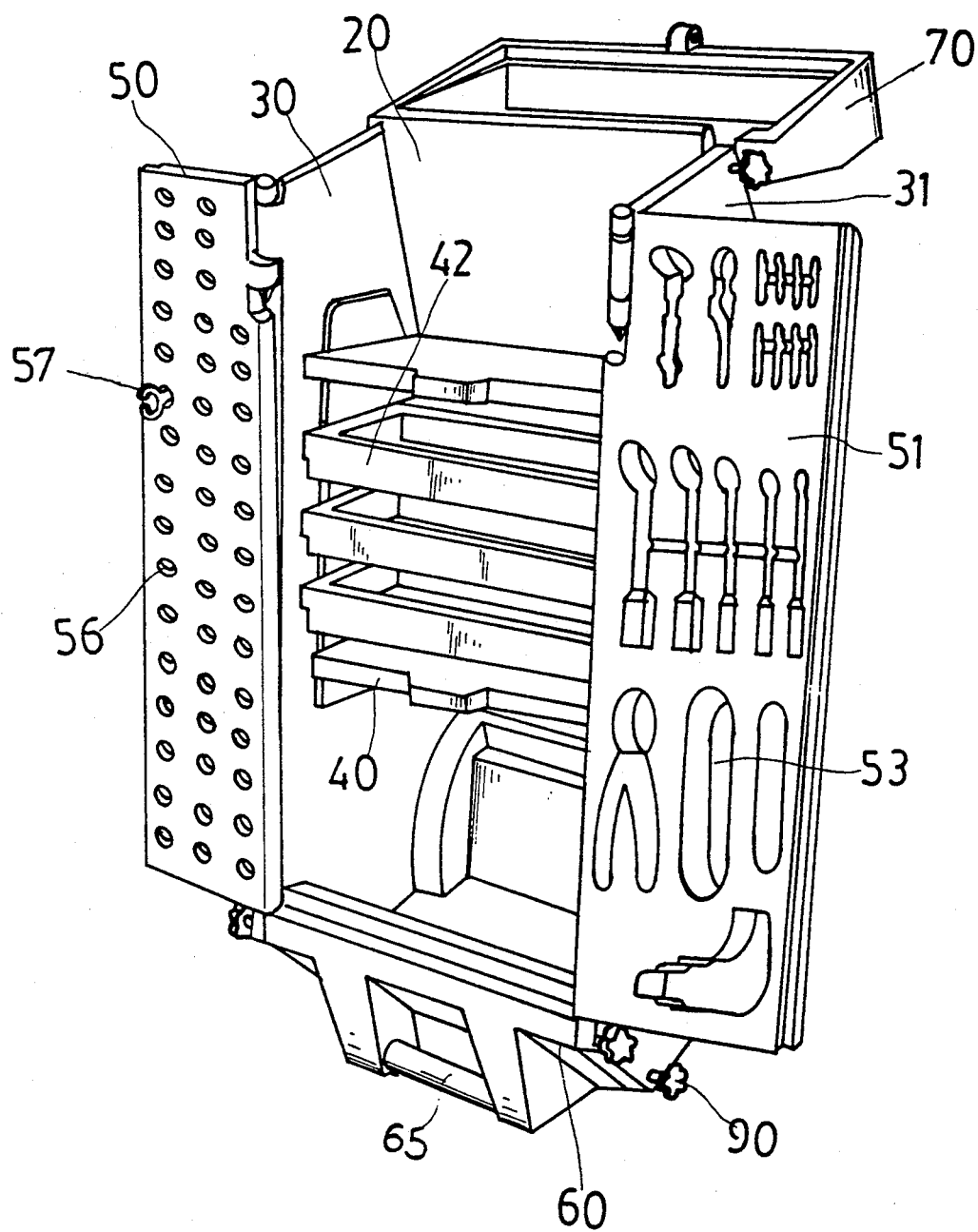
FIG. 2 is an elevational view of the built-up tool carriage when opened.
Figure 3:
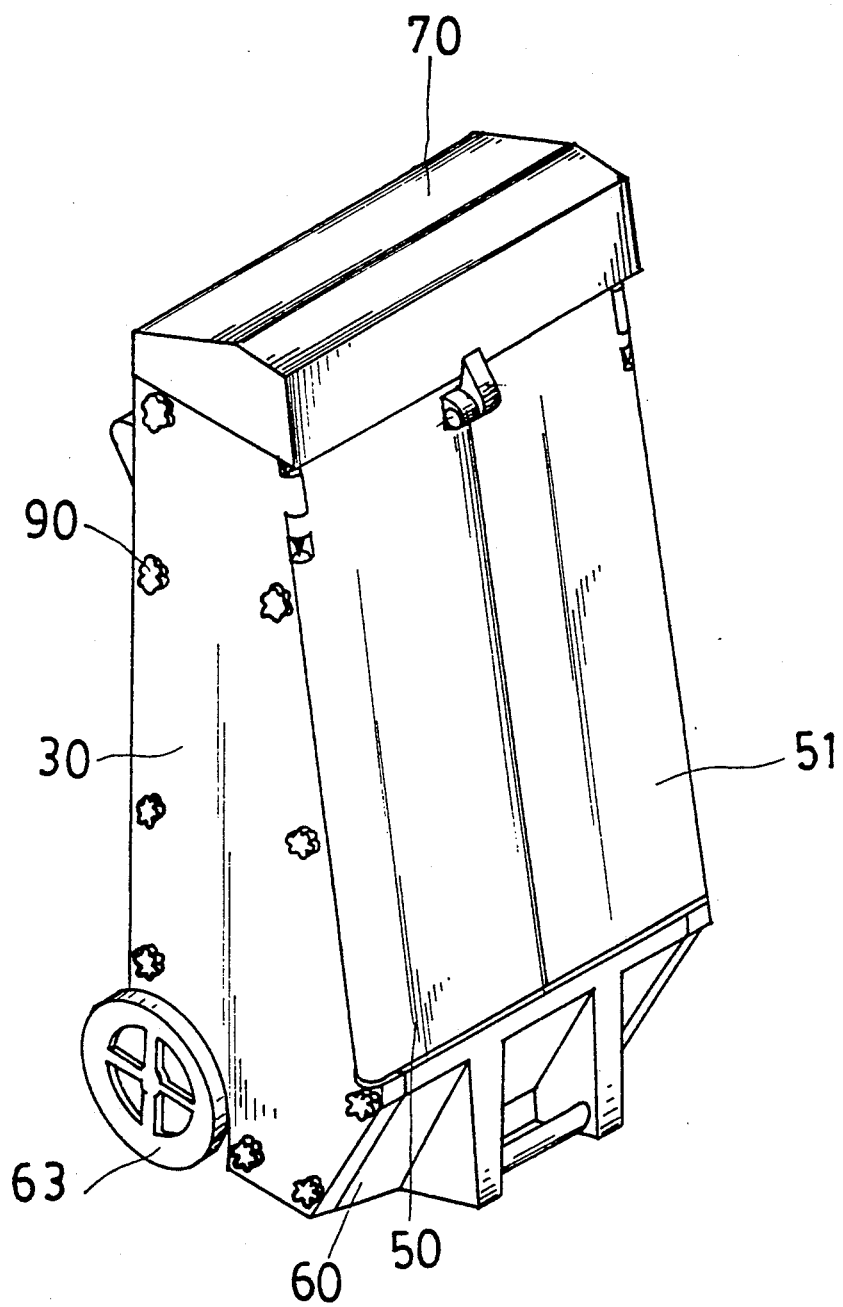
FIG. 3 is an elevational view of the built-up tool carriage when closed.

Referring to FIGS. 1 and 2, therein illustrated is a built-up tool carriage 10 embodying the present invention, which is generally comprised of a back panel 20, two symmetrical side panels 30 and 31, two division boards 40, a plurality of sliding boxes 42, two symmetrical door panels 50 and 51, a base 60, a top cover 70, a plurality of connecting rods 80, a plurality of hand screws 90, and a plurality of bolts 93. The back panel 20 is made from a rectangular plate having tenons 21 and round holes 22 longitudinally alternatively aligned on two opposite longer side edges thereof, an elongated groove 23 transversely made on an inside face adjacent to a bottom edge thereof, two lugs 24 transversely aligned on an outside face adjacent to a top edge thereof, and a handhold 26 on the outside face below the lugs 24. The side panels 30 and 31 have each a groove 32 on an inside face thereof along a longitudinal side edge and a transverse bottom edge thereof, a plurality of round holes 33 spaced on the groove 32, a plurality of rectangular blocks 34 transversely raised from the inside face and spaced from one another by channels 35, a pin bushing 36 and a stop block 37 on an opposite longitudinal side edge on two opposite ends, and two spaced through holes 39 adjacent to the opposite longitudinal side edge. The two division boards 40 are respectively inserted into the top and bottom channels 35 and retained between the two symmetrical side panels 30 and 31, having each a through hole 41 through the respective body in longitudinal direction adjacent to the respective front edge. The sliding boxes 42 are respectively inserted in the channels 35 between the two division boards 40 and 41 and moved to slide between the two side panels 30 and 31. The two door panel 50 and 51 have each a pin bushing 52 on one side edge thereof at an upper location, a pin 55 on the bottom in line with the pin bushing 52. Furthermore, one door panel 50 has a plurality of holes 56 on an inside face thereof for inserting hooks 57 for hanging tools or other things; the door panel 51 has various tool compartments 53 of different sizes and shapes on an inside face thereof for keeping different tools and accessories. The base 60 has tenons 61 and round holes 62 alternatively aligned on two opposite side edges thereof for fastening the side panels 30 and 31, two wheels 63 supported on the back on two opposite ends, a transverse tongue 64 on the back above the wheels 63 which fits into the elongated groove 23 on the back panel 20, and a transverse handhold 65 on the front. The top cover 70 has two projecting blocks 71 spaced on the back, of which each has a round hole 72 for fastening the back panel 20. The connecting rods 80 are each made from a respective straight tube having two bolt holes 81 on two opposite ends. The hand screws 90 are each comprised of a screw rod 92 extended from a hand knob 91. The bolts 93 are provided for connecting the projecting blocks 71 to the lugs 24, and the pin bushings 52 of the door panels 50 and 51 to the pin bushings 36 of the side panels 30 and 31. Each bolt 93 is comprised of a cylindrical head 94 on one end, a split cone 96 on an opposite end, and an elongated rod portion 95 connected therebetween.

The assembly process of the present invention is quite simple and outlined hereinafter. The back panel 20 is attached to the base 60 at right angle with the transverse tongue 64 engaged into the elongated groove 23. Then, attach the two symmetrical side panels 30 and 31 to the base 60 and the back panel 20 on two opposite sides at right angles with the tenons 21 and 61 on the back panel 20 and the base 60 respectively inserted in the grooves 32 on the side panels 30 and 31, permitting the round holes 33 on the two side panels 30 and 31 to be aligned with the round holes 22 on the back panel 20 and the round holes 62 on the base 60 for inserting connecting rods 80 respectively. As soon as respective connecting rods 80 have been inserted through the round holes 32, 33 and 62, respective hand screws 90 are threaded into the bolt holes 81 on the two opposite ends of each connecting rod 80 to firmly secure the side panels 30 and 31, the back panel 20 and the base 60 together. Then, the division boards 40 are inserted into the top and bottom channels 35 permitting the respective through holes 41 to be aligned with the respective through holes 39 on the two side panels 30 and 31 for inserting two connecting rods 80. Respective hand screws 90 are threaded into the bolt holes 81 on these two connecting rods 80 to firmly secure the two division boards 40 to the two side panels 30 and 31, and therefore, the sliding boxes 42 can be inserted into the other channels 35 between the two division boards 40 to slide one above another between the two side panels 30 and 31. The two front door panels 50 and 51 are then respectively attached to the two side panels 30 and 31 with the respective bottom pin 55 inserted into a respective hole (not shown) on the respective stop block 37. At the same time, the pin bushing 36 of the respective side panel 30 or 31 is stopped above the pin bushing 52 of the respective door panel 50 or 51 and secured in place by a bolt 93. Therefore, the two front door panels 50 and 51 become hinged to the two side panels 30 and 31 on the front. At the final, the top cover 70 is covered on the side panels 30 and 31 and the back panel 20 on the top with the two projecting blocks 71 thereof pivotably secured to the two lugs 24 by two bolts 93.

I claim:

1. A built-up tool carriage comprising:

a base, said base comprising tenons and round holes alternatively aligned on two opposite side edges thereof, two wheels bilaterally mounted on a bottom edge adjacent to a rear end thereof, a tongue transversely formed on said rear end above said wheels, and a handhold transversely made on a front end thereof;

a back panel vertically attached to the rear end of said base, said back panel comprising tenons and round holes longitudinally alternatively aligned on two opposite side edges thereof, a groove transversely made on a front face adjacent to a bottom edge thereof into which the tongue of said base is engaged, two spaced eyed lugs transversely aligned on a back face adjacent to a top edge thereof, and a handhold transversely made on the back face below said eyed lug;

two symmetrical side panels vertically attached to said base and said back panel on two opposite sides, said side panels comprising each a plurality of elongated grooves around a peripheral edge thereof into which the tenons on said base and said back panel are engaged, a plurality of round holes respectively aligned with the round holes on said base and said back panel and secured thereto by connecting rods and hand screws, a plurality of rectangular blocks transversely raised from an inner face thereof and spaced from one another by parallel channels, said channels including a top channel, a bottom channel and a plurality of intermediate channels, a pin bushing and a stop block longitudinally aligned on an opposite side edge thereof on two opposite locations, and two spaced through holes adjacent to the opposite side edge, said stop block having a hole longitudinally aligned with the hole defined in the pin bushing;

two division boards respectively inserted into said top and bottom channels, said division board having each a through hole respectively aligned with the through hole on either said side panel;

a plurality of sliding boxes respectively inserted in said intermediate channels and moved to slide between said side panels;

two front door panels respectively hinged to said side panels for access control, said front door panels comprising each a pin bushing on one side edge thereof at an upper location stopped above the pin bushing on either said side panel, and a pin on a bottom edge thereof respectively inserted into the hole on the stop block of either said side panel, said front door panels including one having a plurality of holes on an inside face thereof for inserting hooks for hanging tools and the other having tool compartments of different sizes and shapes on an inside face thereof for keeping different tools and accessories;

a top cover hinged to said back panel and covered over said side panels on the top, said top cover comprising two eyed projecting blocks on a rear peripheral edge thereof respectively hinged to the eyed lugs on said back panel;

a plurality of connecting rods respectively inserted through the round holes on said side panels, said back panel and said base and the through holes on said side panels and said division boards, said connecting rods having each two bolt holes on two opposite ends;

a plurality of hand screws respectively threaded into the bolt holes on said connecting rods to secure said connecting rods to said side panels permitting said base, said back panel and said side panels to be firmly connected together; and a plurality of bolts for connecting said eyed projecting blocks of said top cover to said eyed lugs of said back panel and the pin bushings of said front door panels to the pin bushings of said side panels respectively, said bolts comprising each a cylindrical head on one end, a split cone on an opposite and an elongated rod body connected therebetween.

* * * * *